(12) United States Patent
Lawrence et al.

(10) Patent No.: US 9,867,366 B2
(45) Date of Patent: *Jan. 16, 2018

(54) PEST CONTROL APPARATUS AND PROCESS OF MANUFACTURE

(71) Applicant: SUTERRA, LLC, Los Angeles, CA (US)

(72) Inventors: Michael Lawrence, Sisters, OR (US); Ernest Netter, Bend, OR (US); Cheyne Detwiler, Bend, OR (US)

(73) Assignee: SUTERRA, LLC, Los Angeles, CA (US)

(*) Notice: Subject to any disclaimer, the term of this patent is extended or adjusted under 35 U.S.C. 154(b) by 307 days.

This patent is subject to a terminal disclaimer.

(21) Appl. No.: 14/821,002

(22) Filed: Aug. 7, 2015

(65) Prior Publication Data

US 2016/0106088 A1    Apr. 21, 2016

Related U.S. Application Data

(63) Continuation of application No. 13/909,879, filed on Jun. 4, 2013, now Pat. No. 9,113,622.

(51) Int. Cl.
*A01M 1/20* (2006.01)
*A01M 1/10* (2006.01)
*A01M 1/02* (2006.01)
*A01G 13/10* (2006.01)

(52) U.S. Cl.
CPC .......... *A01M 1/2016* (2013.01); *A01G 13/10* (2013.01); *A01M 1/02* (2013.01); *A01M 1/106* (2013.01); *A01M 1/2055* (2013.01)

(58) Field of Classification Search
CPC ...... A01M 1/2016; A01M 1/02; A01M 1/106; A01M 1/2055
See application file for complete search history.

(56) References Cited

U.S. PATENT DOCUMENTS

| | | | | |
|---|---|---|---|---|
| 4,833,819 | A | * 5/1989 | Sherman | A01M 25/004 206/560 |
| 4,899,485 | A | * 2/1990 | Schneidmiller | A01M 1/02 43/107 |
| 5,119,586 | A | * 6/1992 | Townsend | A01M 1/023 43/114 |
| 5,271,179 | A | * 12/1993 | Cohen | A01M 1/2011 43/131 |
| 5,685,109 | A | 11/1997 | Rimback | |
| 5,771,628 | A | * 6/1998 | Nobbs | A01M 1/14 43/121 |
| 5,839,221 | A | 11/1998 | Ron et al. | |

(Continued)

FOREIGN PATENT DOCUMENTS

EP          100730 A1 *  2/1984

*Primary Examiner* — Christopher P Ellis
(74) *Attorney, Agent, or Firm* — Michael Best & Friedrich LLP (57) ABSTRACT

An environmentally friendly apparatus to attract and kill insect pests is described. The apparatus includes two panels, which could be made from one folded sheet, coupled together to form a housing for a pad containing an insect attractant, e.g. a pheromone. The outer surface of the housing has a plurality of louvered vents for dispersion of the scent from the attractant to the environment thus attracting the insect pest. The apparatus is configured to be capable of being on a fruit tree.

17 Claims, 8 Drawing Sheets

(56) References Cited

U.S. PATENT DOCUMENTS

| | | | |
|---|---|---|---|
| 5,939,062 A | 8/1999 | Heath et al. | |
| 6,546,668 B1 * | 4/2003 | Ball | A01M 1/2005 43/107 |
| 6,618,983 B1 * | 9/2003 | Spragins | A01M 1/14 43/107 |
| 7,165,353 B2 * | 1/2007 | Matts | A01M 1/026 43/131 |
| 8,146,290 B1 | 4/2012 | Telly | |
| 2005/0028431 A1 * | 2/2005 | Noyes | A01M 25/004 43/131 |
| 2006/0283076 A1 | 12/2006 | Chambers et al. | |
| 2008/0086932 A1 * | 4/2008 | Cook | A01M 1/02 43/114 |
| 2008/0256843 A1 * | 10/2008 | Hack | A01M 1/016 43/131 |
| 2009/0293342 A1 | 12/2009 | Winkler | |

* cited by examiner

PEST CONTROL APPARATUS AND PROCESS OF MANUFACTURE

CROSS-REFERENCE TO RELATED APPLICATIONS

The present application is a continuation of U.S. patent application Ser. No. 13/909,879, filed on Jun. 4, 2013, which claims the benefit of U.S. Provisional Application Ser. No. 61/829,933, filed on May 31, 2013, and claims the benefit of U.S. Provisional Application Ser. No. 61/655,418, filed on Jun. 4, 2012, all of which are herein incorporated by reference for completeness of disclosure.

BACKGROUND OF THE INVENTION

Field of the Invention

Embodiments of the invention described herein pertain to the field of agriculture. More particularly, but not by way of limitation, one or more embodiments of the invention enable a device for insect pest control.

Description of the Related Art

The Mediterranean fruit fly (*Ceratitis capitata*), or medfly, causes extensive damage to a wide range of fruit, including soft fruit and citrus. Medfly eggs are laid directly under the skin of fruit, and their larvae develop within the fruit. Medfly infestations have the potential to cost hundreds of millions of dollars in damage to crops. Typically, the medfly is controlled by spraying chemical insecticides, such as dimethoate, malathion and deltamethrin. When chemicals are sprayed, they must be applied over the entire growing area, often using airborne dispersal methods. Large amounts of these chemical insecticides must be reapplied multiple times in direct contact with the crop to be effective.

Although the medfly is considered eradicated in the United States, local infestations are known to occur. When a medfly infestation is detected, immediate measures must be taken to prevent a regional problem. Because medfly larvae develop within fruit, there is a risk of spreading medfly during the transportation of produce in normal distribution channels.

Spraying procedures require repeated dispersal of large quantities of the insecticide in the environment. Furthermore, spraying procedures result in direct contact between the pesticide and the crop. There are few organically accepted insecticides that are effective against medfly, even when used in direct contact with the crop. The toxicity and environmental effects of these standard procedures are a contested issue. For these reasons, many insecticides suitable for controlling medfly are restricted by legislation.

BRIEF SUMMARY OF THE INVENTION

One or more embodiments of a pest control apparatus and process of manufacture thereof are described. The pest control apparatus includes a housing with an attractant insert, such as a protein attractant, a pheromone attractant, and/or a food attractant. In one or more embodiments, the attractant attracts *Ceratitis capitata* to the apparatus where it comes in contact with an appropriate insecticide, which results in its death. Thus, the purpose of the present invention is an apparatus to attract and kill an insect pest.

The attractant insert is placed inside of a vented housing, which has an insecticide coating on the outside surface. The housing includes a first and second panel, with at least one of the panels being coated with the insecticide. The housing may be made of any sheet-like material, such as vinyl, paper, cardboard, fabric, plastic, or any other suitable sheeting material capable of holding a coating of the insecticide compound. The housing is configured with an inner cavity to receive the attractant insert (e.g. a pad). The housing also includes a plurality of louvered vents configured to facilitate airflow between the inner cavity and the outside environment.

The pest control device further includes a hook for hanging the apparatus on a portion of a fruit tree or other desired locations. The hook may be made of wire, metal, wood, plastic, clip, string, rope, or any other suitable material. In one or more embodiments, the hook is built into the housing of the apparatus.

The insecticide coating may include an insecticide effective against *Ceratitis capitata*, such as deltamethrin. Other insecticides and insect pests are contemplated.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

An apparatus for effective and environmentally friendly pest control will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting.

One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention.

Readers should note that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Figure 1:
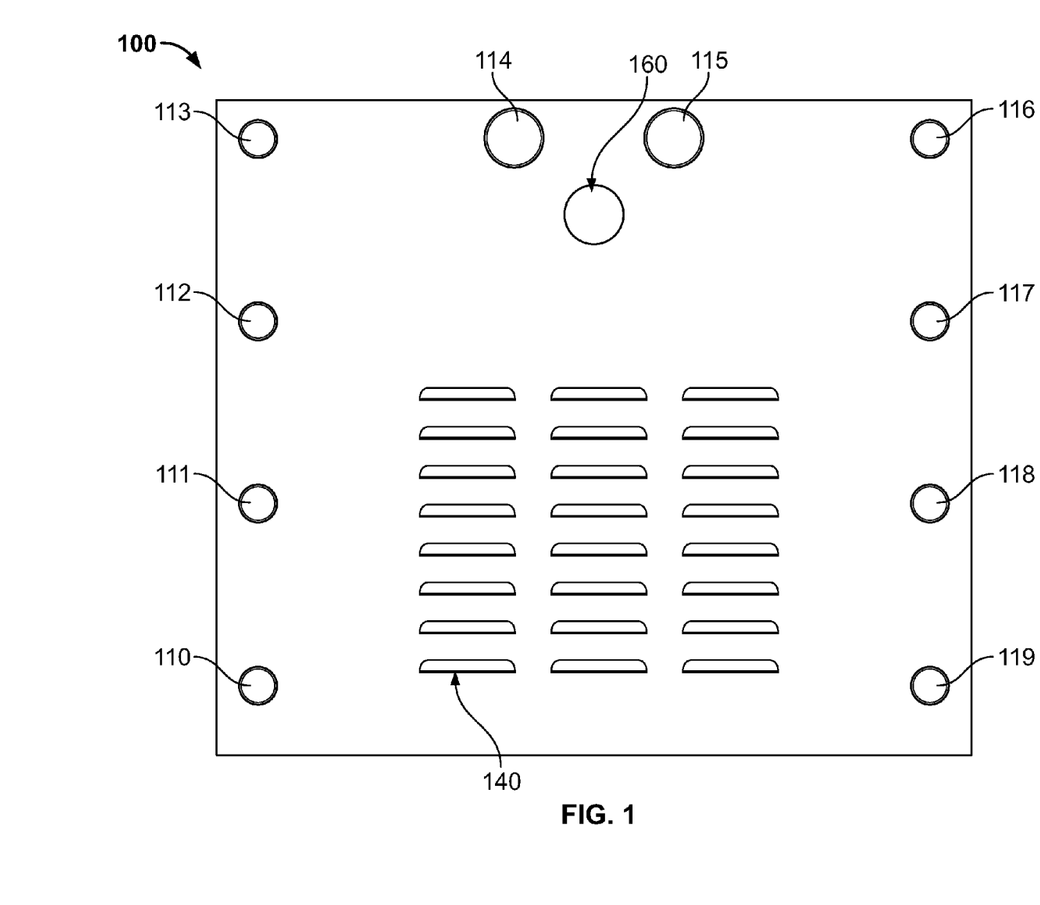
FIG. 1 illustrates the pest control apparatus in accordance with one or more embodiments of the present invention.
Figure 2:
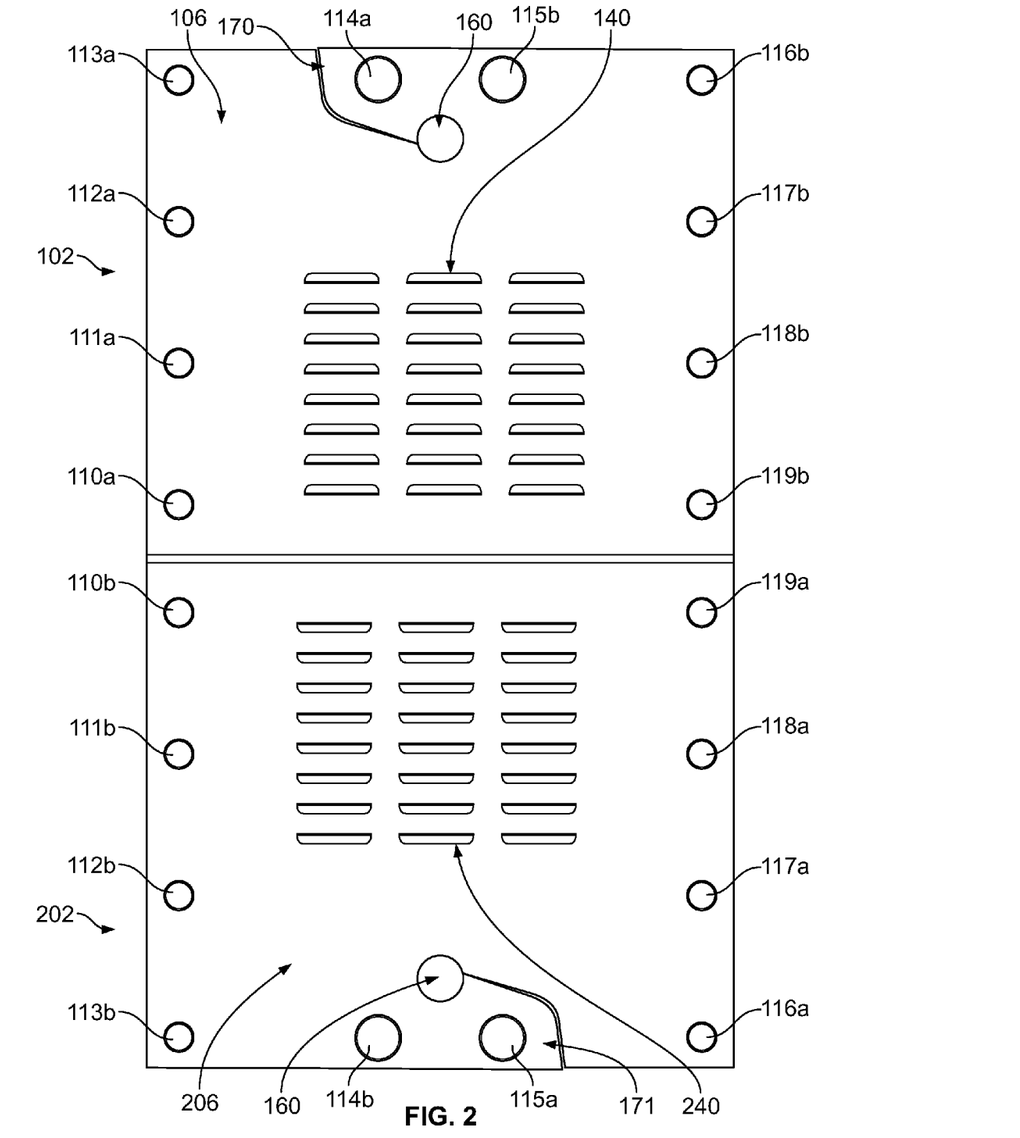
FIG. 2 illustrates a partial assembly of the pest control apparatus of FIG. 1.

FIGS. 1 to 2 illustrate the pest control apparatus in accordance with one or more embodiments of the present invention. One or more embodiments of the present invention comprise housing 100 with two panels: first panel 102 and second panel 202. Housing 100 may be made from two separate panels (not shown) 102 and 202 or from one foldable material to form the two panels, as illustrated in FIG. 2. In the preferred embodiment, housing 100 is a single foldable material for ease of manufacture, as discussed below. Housing material 100 may comprise any sheet-like material, such as paper, cardboard, fabric, plastic, vinyl, or any other suitable sheeting material capable of releasably holding a coating of the insecticide compound. That is, the material for the housing should be capable of being coated with an insecticide and also capable of releasing a portion of the insecticide onto the insect pest upon contact.

The first panel 102 of housing 100 comprises an outside surface 106 and an inner surface (i.e. opposing surface, not shown). The outer surface 106 is configured to be capable of being coated with an appropriate insecticide. The particular insecticide depending on the target insect pest for which control and/or eradication is desired. The second section 202 of housing 100 also comprises an outer surface 206 and an inner surface (i.e. opposing surface, not shown). Outer surface 206 is also configured to be capable of being coated with an appropriate insecticide.

In one or more embodiments, housing 100 is substantially rectangular in shape. However, those of skill in the art would appreciate that housing 100 could take any shape, e.g. square, oval, circular, triangular, decorative, etc. Thus, it should be apparent that shape of housing 100 is not critical to the apparatus of the present invention so long as the function of attracting and killing the target insect pest is achieved. Therefore, although the embodiments described herein are rectangular in shape, it should not limit the scope of the invention.

For ease of manufacture, housing 100 is preferably any rectangular foldable and durable material with an outer surface capable of holding and delivering an insecticide to the target insect pest.

Housing 100 is further configured with a plurality of latches, e.g. 110 to 119, each of which is configured with a male and a female part, e.g. male 110a and female 110b. As illustrated, the plurality of latches is located substantially along the perimeter of panels 102 and 202. Each latch, e.g. 110, is configured and located such that the male member, e.g. 110a, snaps into the corresponding female member, e.g. 110b, to hold the inner surface of the first panel 102 against the inner surface of the second panel 202 thereby forming a housing with an inside cavity for a pad 300.

The latches are configured such that each male member comprises an indentation protruding from the outside surface of the panel towards said inner surface and each female member comprises a well created by an indentation protruding from the inner surface to the outer surface of the panel such that the outside perimeter of a male member fits securely (i.e. snuggly) into said well of a female member to hold both panels together. In one or more embodiments, the panels may be separated by pulling apart, e.g. from the top, in order to replace pad 300 that is located in the inside cavity.

The latches may be arranged with all male members on one panel and all female members on the second panel. They may also be arranged such that a male member is adjacent to a female member on the same panel. Thus, it should be clear that arrangement of the male and female members of the latches on the panels is discretionary. Also, the configuration of the latches is discretionary so long as they are configured to releasably couple both first and second panel together to form the housing. Also, as is discussed below, the latches may be configured to fixedly hold both panels together and a slit provided, e.g. 420 in FIG. 4, for servicing (e.g. replacing) the pad located in the inside cavity.

Housing 100 is further configured such that the inside cavity is capable of housing one or more pad 300. Pad 300 is capable of holding an appropriate insect attractant, e.g. a protein attractant, a pheromone attractant, and/or a food attractant, and combinations thereof that can attract the target insect pest. Thus, pad 300 is preferably an absorbent material such as gauze that is capable of holding the attractant for delivery over an extended period of time. In one or more embodiments, the inside cavity of housing 100 may include a plurality of attractants (Pad 300) for one or more insect pest species.

Housing 100 is further configured with a plurality of louvered vents 140 on the first panel and louvered vents 240 on the second panel. The louvered vents are configured to substantially encompass the area defined by attractant insert 300 and provide ventilation from the inner cavity to outside of the housing. It is through the ventilation provided by these louvered vents that the target insect perceives the aroma of the attractant located in the inside cavity and is lured to land on the surface of the housing where it comes into contact with the insecticide, which results in its death.

In the present illustration, the plurality of louvered vents may be arranged in one or more parallel columns and a plurality of parallel rows beginning substantially close to the bottom portion of the housing. The benefits of the louvered vents are significant. For instance, they provide protection of the attractant against weather and related events (e.g. rain) and additional landing area for the insect pest to come in contact with the insecticide.

Although louvered vents are described herein, it should be apparent to those of skill in the art that any type vent or opening (e.g. circular holes, rectangular holes, etc) that sufficiently provides ventilation for the inside of the housing (i.e. inside cavity) is covered by the present invention.

Figure 4:
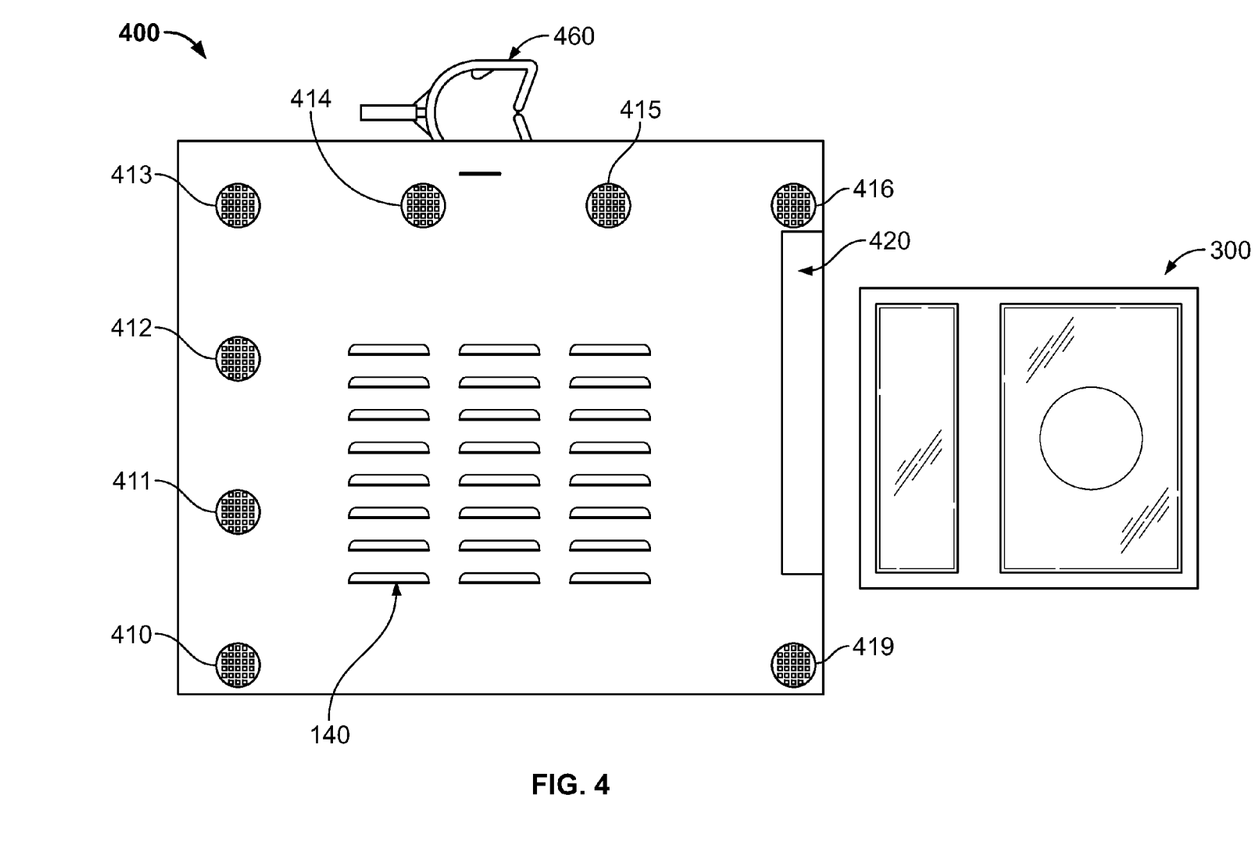
FIG. 4 illustrates a preferred embodiment of the pest control apparatus in accordance with one or more embodiments of the present invention.
Figure 5:
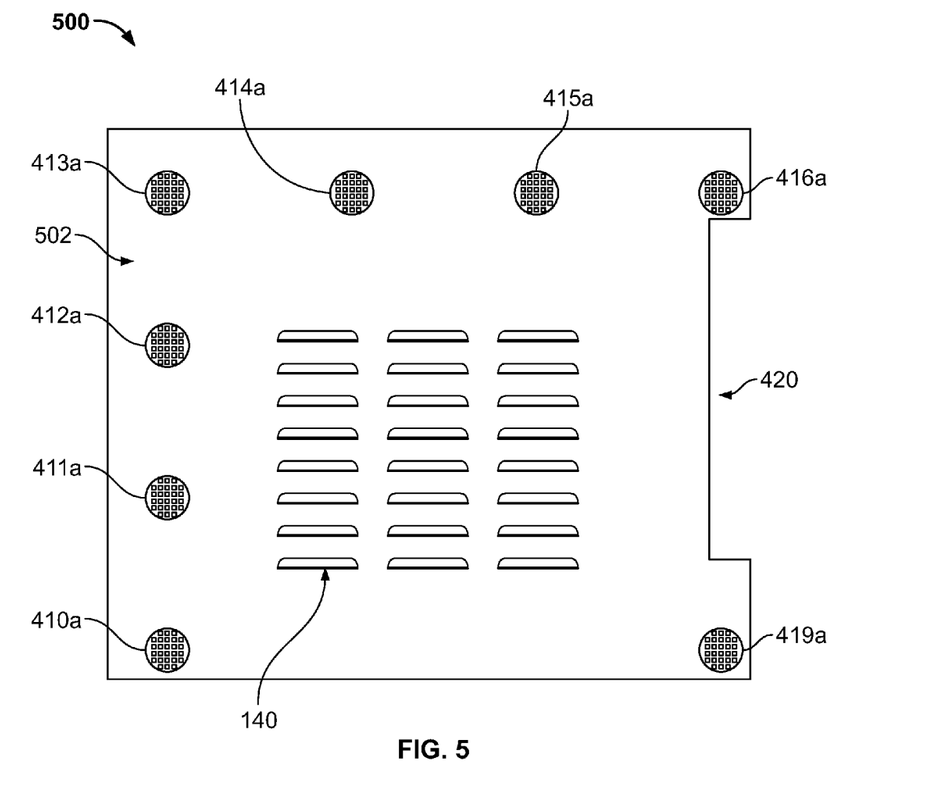
FIG. 5 illustrates the first panel of the pest control apparatus in accordance with one or more embodiments of the present invention.
Figure 6:
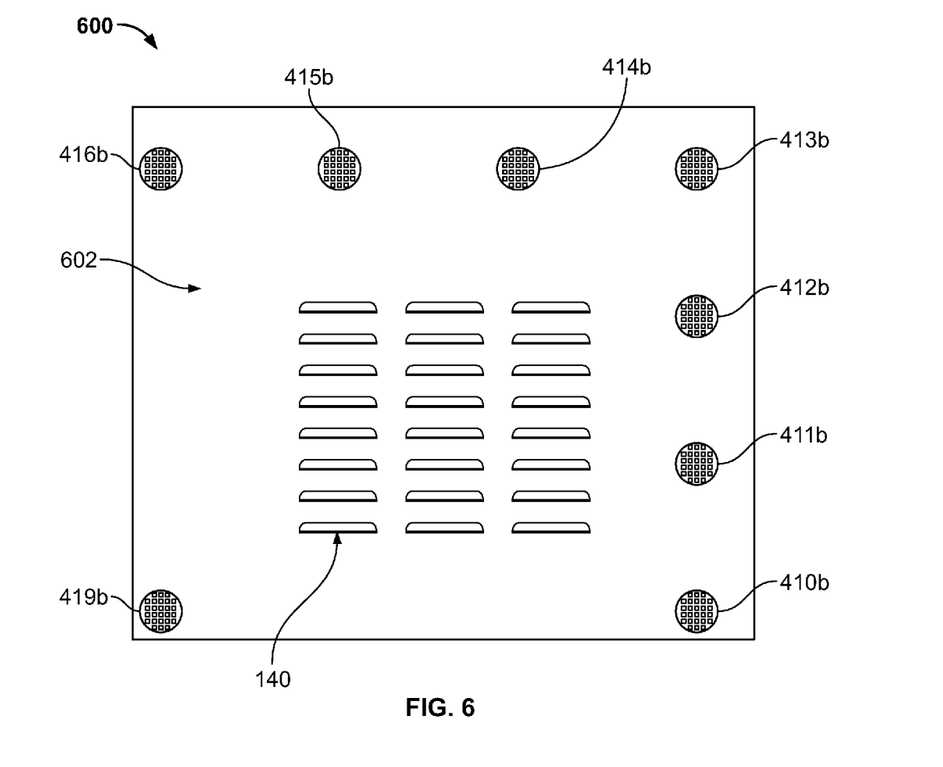
FIG. 6 illustrates the second panel the pest control apparatus in accordance with one or more embodiments of the present invention.

FIGS. 4 to 6 illustrate a preferred embodiment of the pest control apparatus in accordance with the present invention. One or more embodiments of the present invention comprise housing 400 with two panels: first panel 500 and second panel 600. Housing 400 may be made from two separate panels 500 and 600, as shown in FIGS. 5 and 6 or preferably from one single foldable material to form the two panels, as illustrated in FIG. 2. In the preferred embodiment, housing 400 is a single foldable material for ease of manufacture, using the process of manufacture described below. Material for Housing 400 may be made from any sheet-like material, such as paper, cardboard, fabric, plastic, vinyl, or any other suitable sheeting material capable of releasably holding a coating of the insecticide compound. That is, the material for the housing should be capable of being coated with an insecticide and also capable of releasing a portion of the insecticide onto the insect pest upon contact.

The first panel 500 of housing 400 comprises an outside surface 502 and an inner surface (i.e. opposing surface, not shown). The outer surface 502 is configured to be capable of being coated with an appropriate insecticide. The particular insecticide depending on the target insect pest for which control and/or eradication is desired. The first panel also includes a slit 420 which will be discussed further below.

The second panel 600 of housing 400 also comprises an outer surface 602 and an inner surface (i.e. opposing surface, not shown). Outer surface 602 is also configured to be capable of being coated with an appropriate insecticide.

In one or more embodiments, housing 400 is substantially rectangular in shape. However, those of skill in the art would appreciate that housing 400 could take any shape, e.g. square, oval, circular, triangular, etc. Thus, it should be apparent that the shape of housing 400 is not critical to the apparatus of the present invention so long as the function of attracting and killing the target insect pest is achieved. Therefore, although the embodiments described herein are rectangular in shape, it should not limit the scope of the invention.

For ease of manufacture, housing 400 is preferably any rectangular foldable and durable material with an outer surface capable of holding and delivering an insecticide to the target insect pest.

Housing 400 is further configured with a plurality of latch locations, e.g. 410 to 419. As illustrated, the plurality of latch locations is located substantially along the perimeter of panels 500 and 600. Each latch location, e.g. 410, on housing 400 has equivalent locations, e.g. 410a and 410b, on panels 500 and 600, respectively. The latch locations are where the two panels are fixedly coupled in order to hold the inner surface of the first panel 500 against the inner surface of the second panel 600 thereby forming a housing with an inside cavity for a pad 300.

Coupling of panel 500 to panel 600 may be accomplished using a method that is suitable for the material of the housing. For instance, if the material for housing 400 is vinyl or plastic, heat may be used to successfully couple both panels at the latch locations. In other embodiments wherein paper or cardboard is used as material for housing 400, for example, glue may be used to perform the necessary coupling. Other coupling methods such as sewing, welding, stapling, etc. may be used.

The latch locations may also be configured such that the panels are releasably coupled as discussed with respect to FIGS. 1 and 2. In such a case, each latch location may include a latch with a male and female member. Each male member comprises an indentation protruding from the outside surface of the panel towards said inner surface and each female member comprises a well created by an indentation protruding from the inner surface to the outer surface of the panel such that the outside perimeter of a male member fits securely (i.e. snuggly) into said well of an opposing female member to hold both panels together. In one or more embodiments, the panels may be separated by pulling apart, e.g. from the top, in order to replace pad 300 that is located in the inside cavity.

The latches may be arranged with all male members on one panel and all female members on the second panel. They may also be arranged such that a male member is adjacent to a female member on the same panel. Thus, it should be clear that arrangement of the male and female members of the latches on the panels is discretionary. Also, the configuration of the latches is discretionary so long as they are configured to releasably couple both first and second panel together to form the housing. Also, as is discussed below, the latches may be configured to fixedly hold both panels together and a slit provided for servicing (e.g. replacing) the pad located in the inside cavity.

Housing 400 is further configured such that the inside cavity is capable of housing a pad 300. Access to the inside cavity is provided by slit 420 on one side of panel 500. Slit 420 may be created by folding inwards a flap (not shown) created by cutting parallel horizontal lines at the top and bottom of slit 420, for example. Pad 300 is capable of fitting through slit 420 and holding an appropriate insect attractant, e.g. a protein attractant, a pheromone attractant, and/or a food attractant, that can attract the target insect pest. Thus, pad 300 is preferably an absorbent material such as gauze that is capable of holding the attractant for delivery over an extended period of time.

Figure 3:
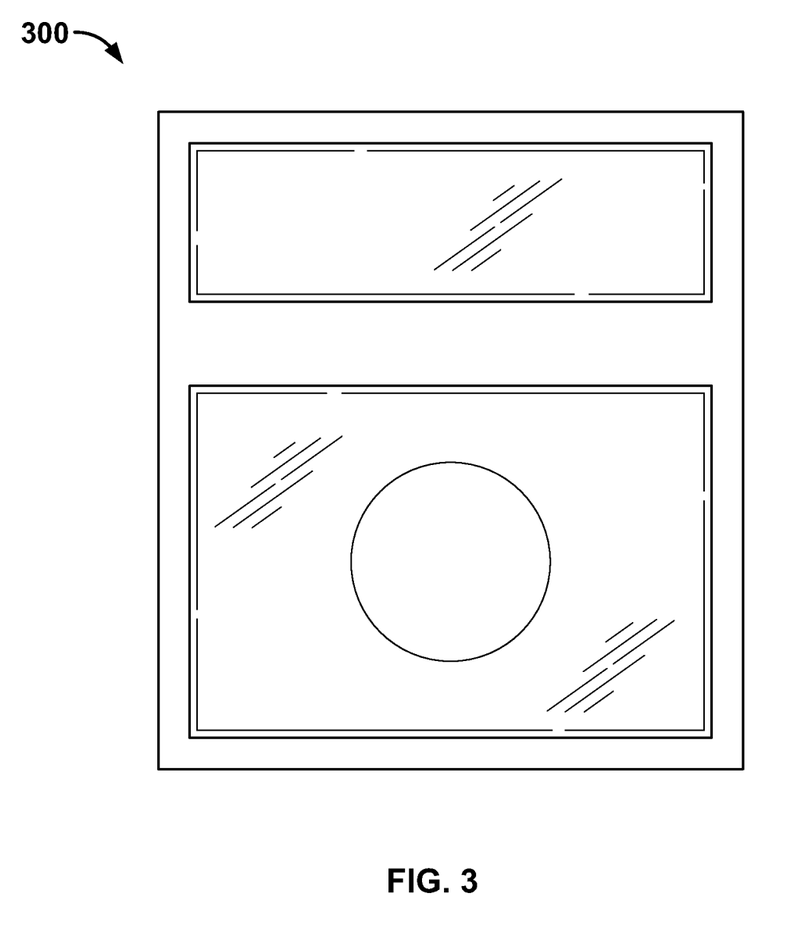
FIG. 3 is an illustration of the attractant insert in accordance with one or more embodiments of the present invention.

FIG. 3 is an illustration of the attractant insert in accordance with one or more embodiments of the present invention. Attractant insert 300 (e.g. a pad) includes an attractant, such as a protein attractant, a pheromone attractant, and/or a food attractant. In one or more embodiments, the attractant is configured to attract *Ceratitis capitata*. Attractant insert 300 may include one or more materials saturated with an attractant. For instance, attractant 300 may be gauze with membrane overlay, an injection molded tablet, built into the inside cavity of the device, etc. Attractant insert 300 may contain a reservoir configured to hold the attractant and dispense the attractant at a controlled rate. In one or more embodiments, the attractant is dispensed through a membrane configured to release the attractant into the air. The membrane may be protected by an air-tight layer, such as a layer made from plastic, to prevent the release of the attractant before removal of the air-tight layer.

In one or more embodiments, attractant insert 300 is provided in a sealed pouch. The attractant insert 300 may be made ready for insertion into the pest control apparatus by opening the sealed pouch to allow for dispersing of the scent of the attractant into the atmosphere. In one or more embodiments, the sealed pouch comprises an air-tight layer, such as a layer made from plastic, to prevent the release of the attractant from attractant insert 300 prior to use. Pad 300 may also be molded into the inside cavity of the apparatus of the present invention. For instance, one or more embodiments of the invention may include vacuum forming a larger cavity on one or both panels of the housing and adding in different attractants covered with a membrane. Thus, it should be apparent that pad 300 is not limited to being configured as an insert.

The pest control apparatus of the present invention is configured to receive attractant insert 300 and hold attractant insert 300 in an interior cavity of the pest control housing. In one or more embodiments, an additional means may be provided to secure attractant insert 300 to the interior of the pest control device. For example, adhesive may be provided to additionally secure attractant insert 300 to an interior surface of the pest control device. In one or more embodiments, the adhesive is disposed directly on attractant insert 300.

Housing 400 is further configured with a plurality of louvered vents 140 on the first panel and louvered vents 240 on the second panel. The louvered vents are configured to substantially encompass the area defined by attractant insert 300 and provide ventilation from the inner cavity to outside of the housing. It is through the ventilation provided by these louvered vents that the target insect perceives the aroma of the attractant located in the inside cavity and is lured to land on the surface of the housing where it comes into contact with the insecticide, which results in its death.

As discussed above, the plurality of louvered vents may be arranged in one or more parallel columns and a plurality of parallel rows beginning substantially close to the bottom portion of the housing. The benefits of the louvered vents are significant. For instance, they provide protection of the attractant against weather and related events (e.g. rain) and additional landing area for the insect pest to come in contact with the insecticide.

Housing 400 is further configured with a hook 460 at the top portion for hanging or deploying the pest control apparatus to a portion of a tree or other desired location. Hook 460 can be built into the body of housing 400 or comprise an external element made of wire, metal, wood, plastic, clip, string, rope, or any other suitable material. In the preferred embodiment, hook 460 is plastic material.

The insecticide coating may be applied to the outer surface of the housing by spraying, rolling, soaking, or any other suitable method. In one or more embodiments, the outer insecticide coating includes at least one insecticide applied substantially on the entire outer surface area of the housing. A buffer zone with essentially no insecticide may be provided on the outer perimeter of the housing to provide an area where a person, for example, deploying the apparatus of the present invention in the field, could hold and/or touch the device without direct contact with the active ingredients of the insecticide. The buffer zone could also be limited to specific areas of the device, e.g. on both sides of the device, on the top of the device, etc.

The insecticide may be applied with a carrier solution such as glue, water, solvent, or any other suitable solution, for instance. The carrier solution may include one or more materials designed to dry or cure into a layer on top of outer surface.

The desired density of insecticide may vary depending on application and other factors. In a preferred embodiment, the outside surface of the device is coated with approximately 0.023 mg/cm$^2$ (±25%) of the active ingredients of an insecticide of deltamethrin, for example. It should be apparent to those of skill in the art that the actual density would depend on, for example, the insecticide, the active ingredients in the insecticide, the material of the housing, the desired kill rate for the insect pest, government regulation, and other factors. Therefore, although the embodiment described in the above example is deltamethrin, it is not intended to limit the scope of the invention.

In one or more embodiments, the insecticide may include an insecticide effective against *Ceratitis capitata* such as deltamethrin and the attractant is preferably a pheromone. It should be apparent to those of skill in the art that the invention is not limited to the killing of *Ceratitis capitata* with the use of deltamethrin as the insecticide, for example. Thus, the present invention contemplates targeting of other insect pests using an appropriate insecticide or combinations of insecticides.

In one or more embodiments, the attractant and the insecticide coating are effective for a planting season, e.g. about five months. The pest control device may be deployed in a crop field, including an orchard.

Figure 7:
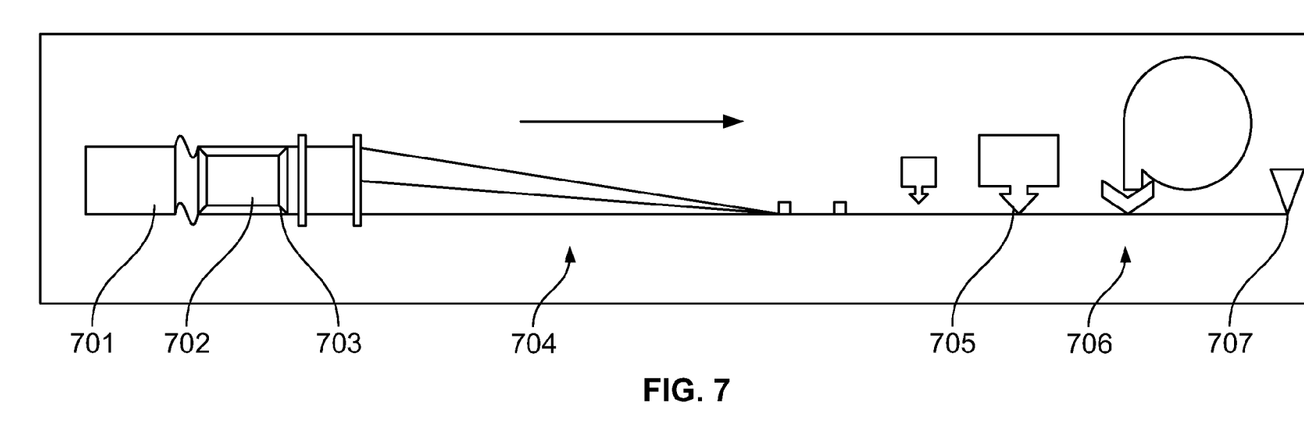
FIG. 7 is an illustration of a process of manufacture in accordance with one or more embodiments of the present invention.

FIG. 7 is an illustration of a process of manufacture in accordance with one or more embodiments of the present invention. As illustrated, a coated roll of material, e.g. vinyl is introduced as feedstock into stage 701. The vinyl is preferably coated on the outer surface with deltamethrin using glue as the adhesive and has a width equivalent to the sum of the heights of the first and second panels. The coated roll feeds through the louver stage at 702 where the plurality of louvered vents 140 and 240 are applied to the material as it passes through the stage. At stage 703, slit 420 is applied to the section of the feedstock representing panel 500. Thus, as the vinyl passes through stage 703, substantially all the perforations for the separate panels have been completed.

At stage 704, the vinyl material is folded such that the inside surface of both panels are in contact and at stage 705, heat is applied at the latch locations to fixedly couple the panels together. At stage 706, hook 460 is applied and at 707 each apparatus is cutout from the rest of the material in the process chain. The process is continuous and repeats for additional pest control devices without any waste from the feedstock.

Figure 8:
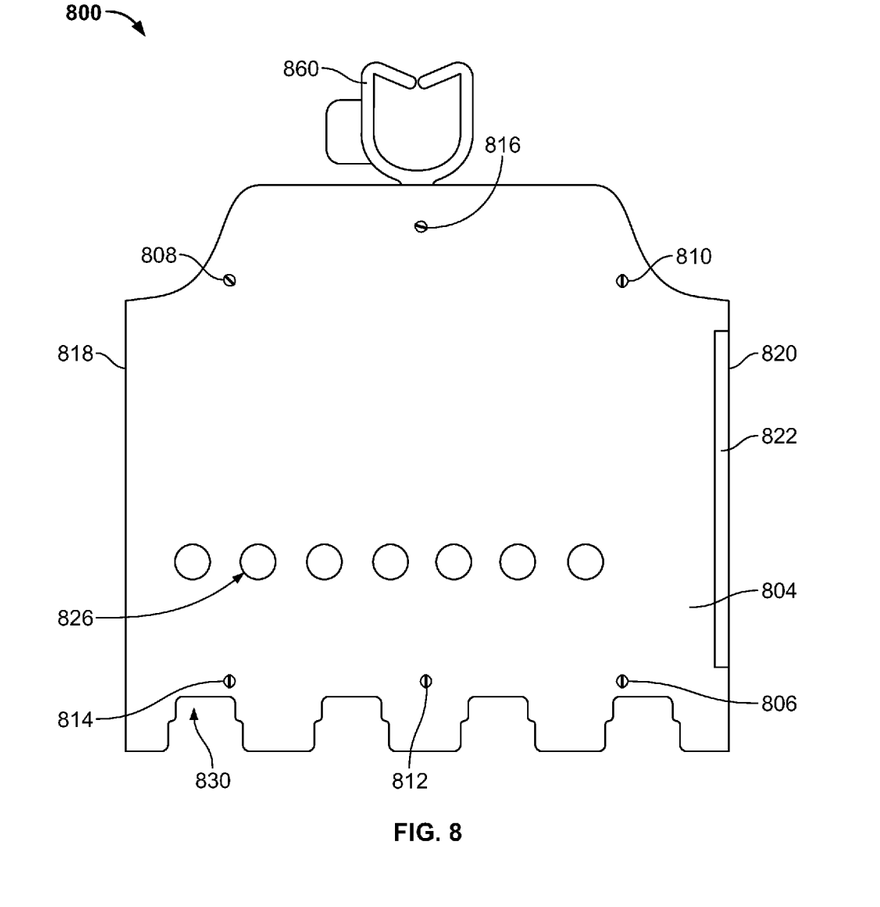
FIG. 8 illustrates another embodiment of the pest control apparatus in accordance with one or more embodiments of the present invention.

FIG. 8 illustrates another embodiment of the pest control apparatus in accordance with one or more embodiments of the present invention. As illustrated, Pest control apparatus 800 comprises a housing with an outer surface 804 coated with an insecticide. Pest control apparatus 800 comprises two panels with an inner surface and an outer surface, as discussed with respect to FIG. 1 and FIG. 4. The panels may be made from a single sheet configured to fold into a housing with an outer insecticide coating and an interior with an inside cavity.

In embodiments with a single sheet, the sheet may be folded along sides 818 or 820 to form both panels of housing 800. The panels of the sheet may be glued, sewn, sealed, welded, stapled, or otherwise coupled at one or more coupling points, e.g. 806-816, on the perimeter of housing 800.

Housing 800 may be made of any sheet-like material, such as paper, cardboard, fabric, vinyl, plastic, or any other suitable sheeting material. One or more panels of the housing may be laminated. Housing 800 comprises one or more vents 826 on one or both panels configured to facilitate airflow between the interior of the housing and an exterior of the housing. In one or more embodiments, vents 826 are configured on both panels of the housing of pest control apparatus 800 such that vents 826 are aligned on the two panels to provide a flow through aperture. Vents 826 may be circular, square, triangular, or any other shape suitable for providing airflow between the inside cavity and the exterior of housing of pest control apparatus 800. Vents 826 may be arranged in a linear, circular, or any other configuration suitable for ventilation.

In one or more embodiments, housing 800 includes two panels with an inner surface and an outer surface with an outer insecticide coating. When coupled together, the inner surface of the first panel faces an inner surface of the second panel to form an inside cavity for attractant 300 between the panels. Housing 800 may have at least one side opening 822 for access into the inside cavity and for placement of one or more attractants 300.

Housing 800 may include decorative cuts 830. The decorative cuts be configured for decorative purposes, design purposes, or to achieve a desired air flow (e.g. ventilation) between an interior and an exterior of the housing of pest control apparatus 800.

The outer insecticide coating may be applied to outer surface of housing 800 by spraying, rolling, soaking, or any other method suitable for applying an outer insecticide coating. In one or more embodiments, the outer insecticide coating includes at least one insecticide and a carrier solution. The carrier solution may include water, solvent, or any other suitable solution. The carrier solution may include one or more materials designed to dry or cure into a layer on top of outer surface.

Both panels of housing 800 may be coupled using one or more fasteners, adhesives, glue, heat, welding, tape, rivets, staples, or any other suitable means for coupling one or more sheets at one or more points and/or surfaces. For example, coupling devices 806-816 maybe used to couple both panels of housing 800 at those latch points.

Pest control apparatus 800 may further include hanger (or hook) 860. Hanger 860 may include wire, metal, wood, plastic, clip, string, rope, or any other suitable material. Hanger 860 may be coupled with the housing of pest control apparatus 800 with one or more fasteners, adhesive, glue, heat, tape, rivets, staples, or any other suitable means for coupling hanger 860 with the housing of pest control apparatus 800. For example, fastener 816 may be used to couple hanger 860 as well as providing a coupling point for both panels. In one or more embodiments, hanger 860 is built into the housing of the pest control device.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for control of insect pests comprising:
   a first panel and a second panel coupled together with a plurality of latches around their outside perimeters to form a housing with an inner cavity for a pad;
   a slit on one side of said first panel configured to provide access for placement and replacement of said pad in said housing;
   a plurality of louvered vents on said first and second panels, said plurality of louvered vents configured to provide ventilation from said inner cavity to outside of said housing; and
   a hook at a top end of said housing for deployment.

2. The apparatus of claim 1, wherein said outer surface of said first and second panels comprises material capable of being coated with an insecticide.

3. The apparatus of claim 1, wherein said first and second panels are on a single piece of material foldable into said housing.

4. The apparatus of claim 1, wherein said housing comprises plastic material.

5. The apparatus of claim 1, wherein said housing comprises paper material.

6. The apparatus of claim 1, wherein said plurality of louvered vents is arranged in one or more columns and a plurality of rows starting substantially at a bottom end of said first and second panels to substantially cover an area described by said pad.

7. The apparatus of claim 1, wherein said plurality of louvered vents is a cutout from said first and second panels and is fixed in position to comprise at least a part of a landing surface for an insect pest, wherein said landing surface is coated with insecticide.

8. The apparatus of claim 1, wherein said outer surface of said first panel and said outer surface of said second panel comprise an insecticide and said pad contains an attractant selected from a group consisting of protein attractant, a pheromone attractant, a food attractant and combinations thereof, and wherein said pad is in said inner cavity with said first and second panels latched together.

9. An apparatus for control of insect pests comprising:
   a first panel and a second panel coupled together with a plurality of latches to form a housing with an inner cavity for a pad, wherein said plurality of latches comprises male and female members located substantially on a perimeter of said first and second panels, wherein said plurality of latches are configured such that said male members snap into said female members to hold said first and second panels together;
   a plurality of louvered vents on said first and second panels, said plurality of louvered vents configured to provide ventilation from said inner cavity to outside of said housing; and
   a hook at a top end of said housing for deployment.

10. The apparatus of claim 9, wherein a first subset of said female members of said plurality of latches and a first subset of said male members of said plurality of latches are on said first panel.

11. The apparatus of claim 10, wherein each one of said first subset of female members is placed adjacent to one of said first subset of male members.

12. The apparatus of claim 9, wherein each of said male members comprises an indentation protruding from said outside surface towards said inner surface and each of said female members comprises a well created by an indentation protruding from said inner surface to said outer surface, wherein an outside perimeter of a male member is configured to securely snap into said well of a female member.

13. The apparatus of claim 9, wherein said plurality of louvered vents is arranged in one or more columns and a plurality of rows starting substantially at a bottom end of said first and second panels to substantially cover an area described by said pad.

14. The apparatus of claim 9, wherein each of said plurality of louvered vents is a cutout from said housing and fixed in position to comprise at least a part of a landing surface for an insect pest, wherein said landing surface is coated with insecticide.

15. The apparatus of claim 9, wherein said outer surface of said first panel and said outer surface of said second panel comprise an insecticide and said pad contains an attractant selected from a group consisting of protein attractant, a pheromone attractant, a food attractant and combinations thereof, and wherein said pad is in said inner cavity with said first and second panels latched together.

16. The apparatus of claim 15, wherein said deployment is on a fruit tree and said attractant is configured to attract a Mediterranean fruit fly.

17. The apparatus of claim 9, wherein said hook comprises a first incision with a first flap at a top end of said first panel and a second incision with a second flap at a top end of said second panel, wherein said first and second incisions are configured to form a hook for holding said housing on a portion of a tree and wherein said first and second flaps are configured to enable placing of said hook on said portion of said tree.

* * * * *